(12) United States Patent
Mule et al.

(10) Patent No.: US 8,554,583 B2
(45) Date of Patent: Oct. 8, 2013

(54) SYSTEMS AND METHODS FOR DETERMINATION OF LONG TERM CARE BENEFITS

(75) Inventors: Daniel Mule, Bethpage, NY (US); Barry Lewis Higgins, Westfield, NJ (US); David Dutille, Reading, MA (US); Terri Hoffman, Austin, TX (US)

(73) Assignee: Metropolitan Life Insurance Co., Long Island City, NY (US)

( * ) Notice: Subject to any disclaimer, the term of this patent is extended or adjusted under 35 U.S.C. 154(b) by 142 days.

(21) Appl. No.: 12/422,839

(22) Filed: Apr. 13, 2009

(65) Prior Publication Data

US 2010/0076792 A1    Mar. 25, 2010

Related U.S. Application Data

(60) Provisional application No. 61/044,432, filed on Apr. 11, 2008.

(51) Int. Cl.
*G06Q 40/00*    (2012.01)
*G06Q 10/00*    (2012.01)
*G06Q 50/00*    (2012.01)

(52) U.S. Cl.
USPC .......................... 705/4; 705/2; 705/3; 705/35

(58) Field of Classification Search
USPC .............................................. 705/2–4, 36, 35
See application file for complete search history.

(56) References Cited

U.S. PATENT DOCUMENTS

| 7,328,183 | B1* | 2/2008 | Leisle .......................... 705/36 T |
| 2003/0229522 | A1 | 12/2003 | Thompson |
| 2004/0138950 | A1 | 7/2004 | Hyman et al. |
| 2007/0050217 | A1 | 3/2007 | Holden |
| 2008/0010086 | A1* | 1/2008 | Skelly et al. ...................... 705/2 |

OTHER PUBLICATIONS

"John Hancock Develops New Marketing Program for Its Leading Edge Long Term Care Insurance Product", PR Newswire, Jan. 30, 2008.*
International Search Report, PCT Appln. No. PCT/US09/40383, Jun. 4, 2009.

* cited by examiner

*Primary Examiner* — Joseph Burgess
(74) *Attorney, Agent, or Firm* — Troutman Sanders LLP (57) ABSTRACT

In one aspect, the invention comprises a computer implemented method comprising: (a) determining an average monthly cost of long term care for a consumer; (b) determining an estimated total cost of long term care for the consumer; (c) receiving and storing in a computer readable medium data describing the consumer's preferences regarding long term care resources; (d) calculating with a processor an initial benefit amount for the consumer; (e) adjusting with a processor the initial benefit amount based on the data describing the consumer's preferences to determine a total benefit amount; and (f) recommending a long term care policy providing the total benefit amount to the consumer, wherein the processors may the same processor or different processors. Other aspects of the invention comprise related method, computer system, and software embodiments.

21 Claims, 4 Drawing Sheets

*Long Term Care Benefit Spectrum*

FIG. 3

Estimated Total Cost of Services is between:

| Under $250,000 | $250,000 – $350,000 | Over $350,000 |
| :---: | :---: | :---: |
| ☐ | ☐ | ☐ |

Step 2. Select the corresponding pool for the initial Total Benefit Amount.

Average Monthly Cost of Home Health Care is between:

Under $4,500    Over $4,500

Step 2.  Select the corresponding pool for the Monthly Benefit Amount.

| $3,000 | $6,000 | $9,000 | $12,000 | $15,000 |

…

SYSTEMS AND METHODS FOR DETERMINATION OF LONG TERM CARE BENEFITS

CROSS REFERENCE TO RELATED APPLICATIONS

This application claims priority to U.S. Provisional Patent Application No. 61/044,432, filed Apr. 11, 2008. The entire contents of that provisional application are incorporated herein by reference.

INTRODUCTION

The need for long term care is a significant and well-recognized problem. Generally, long-term care includes medical, personal, and/or social services needed to meet basic living requirements for an extended period of time. Long-term care is usually provided by a caregiver within the home or through a nursing home or an assisted living facility.

Insurance products are designed to leverage a future probable risk. Although the potential incidence of utilizing a long term care insurance product is fairly high, claims do not however normally occur until late in the product's ownership. Specifically, for example, nursing home populations are not statistically significant until occupants reach their early to mid eighties. However, because the cost of ownership of the product can increase with age as one gets closer to making a claim, and also due to underwriting and availability issues, it is preferable to purchase a long term care insurance product at a young age.

With long-term care insurance, as with life insurance, it is important for customers to buy coverage before they experience significant changes in health that could increase the cost of coverage or prevent access entirely. Therefore the best time to buy is often in one's forties or fifties, when costs can be established at a lower level and medical underwriting is not a problem.

The method, software, and system exemplary embodiments described presented herein may be used by an insurance representative together with a consumer to determine a preferred amount of long-term care coverage and corresponding policy to protect the consumer from the costs associated with long term care services.

One object, feature, or advantage of one or more embodiments of the present invention is to improve upon existing methods for determining insurance for long term care.

Another object, feature, or advantage of one or more embodiments of the present invention is to provide a process for determining insurance for long term care that is easily explainable to customers and potential customers and readily understandable by customers and potential customers.

Another object, feature, or advantage of one or more embodiments of the present invention is to provide a guaranteed renewable rider which can be added to a long term care policy which provides for either compound automatic benefit increase or simple automatic benefit increase.

In one aspect, the invention comprises a computer implemented method comprising: (a) determining an average monthly cost of long term care for a consumer; (b) determining an estimated total cost of long term care for the consumer; (c) receiving and storing in a computer readable medium data describing the consumer's preferences regarding long term care resources; (d) calculating with a processor an initial benefit amount for the consumer; (e) adjusting with a processor the initial benefit amount based on the data describing the consumer's preferences to determine a total benefit amount; and (f) recommending a long term care policy providing the total benefit amount to the consumer, wherein the processors may the same processor or different processors.

In various embodiments: (1) determining an average monthly cost of long term care for a consumer is based on the consumer's geographic location; (2) determining an estimated total cost of long term care for a consumer is based on the consumer's geographic location; (3) the consumer's preferences regarding long term care resources comprise the consumer's preference for utilizing retirement assets; (4) the consumer's preferences regarding long term care resources comprise the consumer's preference for relying on friends and family for long term care; (5) the consumer's preferences regarding long term care resources comprise the consumer's preference for having an amount of coverage with the option to increase coverage in the future instead of having a full amount of coverage; (6) the method further comprises receiving and storing data regarding the consumer's inflation protection preferences; and (7) the long term care policy provides inflation protection.

In another aspect, the invention comprises a program storage device readable by a machine, tangibly embodying a program of instructions executable by the machine to perform steps comprising: (a) determining an average monthly cost of long term care for a consumer; (b) determining an estimated total cost of long term care for the consumer; (c) receiving data describing the consumer's preferences regarding long term care resources; (d) calculating an initial benefit amount for the consumer; (e) adjusting the initial benefit amount based on the data describing the consumer's preferences to determine a total benefit amount; and (f) recommending a policy providing the total benefit amount to the consumer.

In various embodiments: (1) determining with a processor an average monthly cost of long term care for a consumer is based on the consumer's geographic location; (2) determining with a processor an estimated total cost of long term care for a consumer is based on the consumer's geographic location; (3) the consumer's preferences regarding long term care resources comprise the consumer's preference for utilizing retirement assets; (4) the consumer's preferences regarding long term care resources comprise the consumer's preference for relying on friends and family for long term care; (5) the consumer's preferences regarding long term care resources comprise the consumer's preference for having an amount of coverage with the option to increase coverage in the future instead of having a full amount of coverage; (6) the steps further comprise receiving and storing data regarding the consumer's inflation protection preferences; and (7) the long term care policy provides inflation protection.

In another aspect, the invention comprises a computer system comprising: (a) a processor that determines an average monthly cost of long term care for a consumer; (b) a processor that determines an estimated total cost of long term care for the consumer; (c) a processor that receives and stores in a computer readable medium data describing the consumer's preferences regarding long term care resources; (d) a processor that calculates an initial benefit amount for the consumer; (e) a processor that adjusts the initial benefit amount based on the data describing the consumer's preferences to determine a total benefit amount; and (f) a processor that recommends a long term care policy providing the total benefit amount to the consumer, wherein the processors may the same processor or different processors.

In various embodiments: (1) determining an average monthly cost of long term care for a consumer is based on the consumer's geographic location; (2) determining an estimated total cost of long term care for a consumer is based on the consumer's geographic location; (3) the consumer's preferences regarding long term care resources comprise the consumer's preference for utilizing retirement assets; (4) the consumer's preferences regarding long term care resources comprise the consumer's preference for relying on friends and family for long term care; (5) the consumer's preferences regarding long term care resources comprise the consumer's preference for having an amount of coverage with the option to increase coverage in the future instead of having a full amount of coverage; (6) the system further comprises a processor that receives and stores data regarding the consumer's inflation protection preferences; and (7) the long term care policy provides inflation protection.

One or more of these and/or other objects, features, or advantages of one or more embodiments of the present invention will become apparent from the specification and claims that follow.

DETAILED DESCRIPTION OF ONE OR MORE EXEMPLARY EMBODIMENTS

In an exemplary embodiment of the present invention, a questionnaire is employed to determine the long term care insurance needs of a consumer. The questionnaire may comprise a traditional paper questionnaire or a series of data inputs to a computer. Determination of an appropriate long term care insurance coverage amount may be based on the health care costs in a geographic area, as well as the consumer's personal situation and attitudes and preferences towards the consumer's retirement.

An exemplary questionnaire is described in the Appendix below. A consumer's responses to the questions set forth in the questionnaire help determine the appropriate long term care insurance coverage amount. As will be recognized by those skilled in the art, each of the steps described herein may be performed by computer software or hardware (for example, a specialized processor, or an ASIC).

The process of determining long term care coverage described herein broadly involves answering two general questions—(A) "How much is enough?"; and (B) "Which plan is the best suited for a particular consumer?".

A. How Much is Enough:

Step 1: This step involves, for example, identification of an average monthly cost of health care services and estimated total cost of services for a consumer. The average monthly cost of health care may be based, for example, on the average hourly rate of a home health aid or other health care worker for eight hours a day. The total cost of services may be based on the average monthly cost of health care services for 60 months. A chart listing the numbers for these two parameters may be used, or appropriate information (e.g., location of consumer, or consumer's planned retirement location) may be entered into a computer and stored in a computer readable medium. This storage applies, of course, to all data described herein as being collected from a consumer/client. Moreover, all data described herein as being in a table preferably also is stored in a computer readable medium accessible to a computer utilized by a computer implemented embodiment.

Step 2: In this step, the consumer may be informed that the total cost of services for long term care in the consumer's geographic area is simply an estimate of the total cost of health care over an extended period of time. It is possible for the consumer to insure more or less than this amount depending on the consumer's feelings toward retirement and the consumer's personal situation. To better understand the financial impact of long term care services on a consumer's retirement assets, the consumer may be requested to identify the consumer's position on a long term care benefit spectrum (see FIG. 2). The coverage amount may range, for example, from $75,000 to $1 million, the former pointing to a greater exposure to the consumer's retirement assets, while the latter points to a greater protection of the consumer's retirement assets.

Step 3: In this step, the consumer's responses to the following three exemplary statements on, for example, a 5-part scale ranging from Strongly Agree, Agree, Unsure, Disagree to Strongly Disagree, are recorded/entered. The three exemplary statements presented to the consumer are:

a. I would be comfortable relying on family and friends who live nearby to coordinate and/or provide care in the event I need help.

b. I'm comfortable allocating a portion of my retirement income and assets to help pay for any long term care expenses I may incur.

c. I have several years before I retire, and today I'd prefer to own less coverage than I may ultimately need as long as I have the right to increase my coverage in the future regardless of how my health may change.

Each of the responses by the consumer is awarded a predetermined numerical score tied to the response, and the scores are added to determine the consumer's Benefit Adjustment Score.

Step 4: Based on the estimated total cost of services determined by the consumer in step 1, an initial benefit amount is determined. This amount is further adjusted if required (either higher or lower) or left unchanged, using the Benefit Adjustment Score to determine the total benefit amount for the consumer.

Step 5: Similar to step 4, the average monthly cost of health care determined in step 1 is adjusted higher or lower using the Benefit Adjustment Score.

During the process, a consumer may be asked to respond on a 5-part scale to a question that is directed to the consumer's views on inflation. Based on the consumer's age and response, an inflation rider may be included to the long term care calculation arrived at by the above steps.

B. Which Plan is the Best Suited for a Consumer:

The consumer's product recommendation is based on a combination of the Benefit Adjustment Score and the consumer's age. According to the results of the calculation, the policy recommendation may be either a simple policy or a customized policy.

The above and more detailed steps and software are illustrated by the exemplary embodiments described in the Appendix below.

Appendix

Exemplary Long Term Care Insurance Selector

TABLE 1

| State | Area | Avg. Monthly Cost of Home Health Care* | Estimated Total Cost of Services* |
|---|---|---|---|
| AK | Statewide | $5,760 | $345,600 |
| AL | Birmingham | $3,600 | $216,000 |
| AL | Montgomery | $3,360 | $201,600 |
| AR | Little Rock | $3,600 | $216,000 |
| AZ | Phoenix | $5,280 | $316,800 |
| AZ | Tucson | $4,560 | $273,600 |
| CA | Los Angeles | $4,560 | $273,600 |
| CA | San Diego | $4,800 | $288,000 |

TABLE 1-continued

| State | Area | Avg. Monthly Cost of Home Health Care* | Estimated Total Cost of Services* |
|---|---|---|---|
| CA | San Francisco | $5,520 | $331,200 |
| CO | Denver | $5,280 | $316,800 |
| CO | Colorado Springs | $5,760 | $345,600 |
| CT | Hartford | $5,760 | $345,600 |
| CT | Stamford | $5,280 | $316,800 |
| DC | Washington | $4,560 | $273,600 |
| DE | Wilmington Area | $5,280 | $316,800 |
| FL | Jacksonville | $4,560 | $273,600 |
| FL | Orlando | $4,080 | $244,800 |
| FL | Miami | $3,600 | $216,000 |
| GA | Statewide | $4,080 | $244,800 |
| HI | Honolulu | $5,520 | $331,200 |
| IA | Des Moines Area | $5,760 | $345,600 |
| ID | Boise | $4,560 | $273,600 |
| IL | Highland Park Area | $5,040 | $302,400 |
| IL | Chicago | $4,560 | $273,600 |
| IL | Peoria Area | $4,320 | $259,200 |
| IN | Indianapolis | $5,280 | $316,800 |
| IN | Fort Wayne Area | $4,800 | $288,000 |
| KS | Wichita | $4,080 | $244,800 |
| KY | Louisville | $3,840 | $230,400 |
| KY | Lexington | $4,080 | $244,800 |
| LA | Baton Rouge | $3,360 | $201,600 |
| LA | Shreveport Area | $3,120 | $187,200 |
| MA | Statewide | $5,520 | $331,200 |
| MD | Silver Spring | $4,320 | $259,200 |
| MD | Baltimore | $4,800 | $288,000 |
| ME | Statewide | $4,800 | $288,000 |
| MI | Statewide | $4,320 | $259,200 |
| MN | Minneapolis/St. Paul | $5,760 | $345,600 |
| MN | Rochester Area | $7,200 | $432,000 |
| MO | St. Louis | $4,080 | $244,800 |
| MO | Kansas City | $4,320 | $259,200 |
| MS | Jackson | $4,320 | $259,200 |
| MT | Billings | $4,080 | $244,800 |
| NC | Raleigh/Durham | $4,560 | $273,600 |
| NC | Charlotte | $3,840 | $230,400 |
| ND | Fargo Area | $4,320 | $259,200 |
| NE | Omaha | $5,040 | $302,400 |
| NH | Statewide | $5,760 | $345,600 |
| NJ | Statewide | $4,800 | $288,000 |
| NM | Albuquerque | $5,040 | $302,400 |
| NV | Las Vegas | $5,040 | $302,400 |
| NY | New York | $3,840 | $230,400 |
| NY | Syracuse Area | $5,040 | $302,400 |
| NY | Rochester | $5,280 | $316,800 |
| OH | Columbus | $4,320 | $259,200 |
| OH | Cleveland | $4,320 | $259,200 |
| OH | Cincinnati | $4,800 | $288,000 |
| OK | Oklahoma City | $4,080 | $244,800 |
| OK | Tulsa | $4,560 | $273,600 |
| OR | Portland | $4,800 | $288,000 |
| OR | Eugene Area | $4,320 | $259,200 |
| PA | Pittsburgh | $4,560 | $273,600 |
| PA | Scranton Area | $4,800 | $288,000 |
| PA | Philadelphia | $4,080 | $244,800 |
| RI | Providence | $5,520 | $331,200 |
| SC | Columbia | $3,840 | $230,400 |
| SC | Charleston | $4,320 | $259,200 |
| SD | Statewide | $5,040 | $302,400 |
| TN | Nashville | $5,520 | $331,200 |
| TN | Memphis | $3,840 | $230,400 |
| TX | Dallas/Fort Worth | $4,560 | $273,600 |
| TX | Houston | $4,320 | $259,200 |
| TX | Austin | $4,080 | $244,800 |
| UT | Salt Lake City | $5,280 | $316,800 |
| VA | Northern VA | $4,560 | $273,600 |
| VA | Richmond | $4,080 | $244,800 |
| VT | Statewide | $5,520 | $331,200 |
| WA | Seattle | $5,520 | $331,200 |
| WA | Spokane | S4,320 | $259,200 |
| WI | Milwaukee | $5,520 | $331,200 |
| WI | Madison Area | $5,280 | $316,800 |
| WV | Charleston Area | $3,600 | $216,000 |
| WY | Statewide | $5,040 | $302,400 |

*Average Monthly Cost of Home Health Care is based on the average hourly rate of a home health aid for eight hours a day. Total Cost of Services is based on the Average Monthly Cost of Home Health Care for 60 months. Source: The MetLife Market Survey of Adult Day Services & Home Care Costs, September 2007.

I. How Much is Enough?

Exemplary Statement to Client:

"Most people who need some type of long term help prefer to receive care in their own home. In fact, only 11 percent of people who suffer from chronic conditions are permanently confined to a facility.[1] Researching the cost of home health care in your area, or where you'd like to retire, can help identify the most appropriate amount of insurance for your situation."

[1] A Profile of Older Americans, Administration on Aging and AARP, 2003.

Instructions to Agent (Paper forms) Using Table 1 (either in paper form or displayed on a computer screen), find the area where your client currently lives or plans to retire and determine the Average Monthly Cost of Home Health Care and the Estimated Total Cost of Services.

(Computer implementation) Enter or select the area where your client currently lives—or plans to retire.

(Paper forms) Record these amounts in boxes 1 and 2 in the Policy Recommendation Table (Table 2).

(Computer implementation) The Average Monthly Cost of Home Health Care and the Estimated Total Cost of Services for the identified area are stored in memory.

TABLE 2

Policy Recommendation Table

| Avg Monthly Cost of Home Health Care $ | Box 1 | Estimated Total Cost of Services $ | Box 2 | |
|---|---|---|---|---|
| Benefit Adjustment Score | Box 3 | | | |
| | | | | points |
| Total Benefit Amount $ | Box 4 | Monthly Benefit Amount $ | Box 5 | |
| LTC Policy Recommendation | | | | 6 |
| Inflation Option (if applicable) | | | | 7 |

Agent Continues the Client Interview:

"The Total Cost of Services in your area—or where you plan to retire—is an estimate of the total cost for home health care over an extended period of time. You may want to insure more or less than this amount, depending on your feelings toward retirement and your personal situation. To better understand the impact the need for long term care services may have on your retirement assets, locate where you fall on the long term care benefit spectrum [depicted in FIG. 2]."

Figure 2:
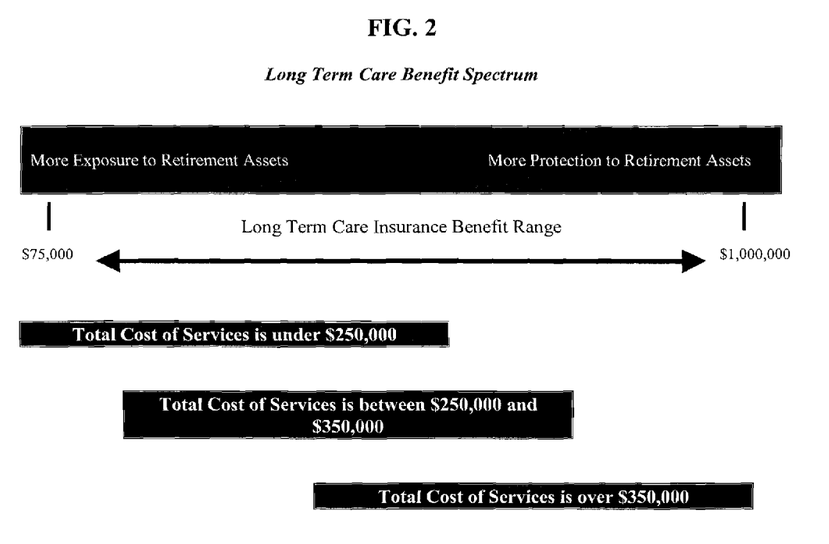
FIG. 2 depicts a long term care benefit spectrum.

(Computer implementation) FIG. 2 may be displayed on a computer screen or other display.

"Your coverage amount can range anywhere from $75,000 to $1 million. In the next step, we will narrow down a coverage amount specific to your situation. Your answers to the questions will help us determine an appropriate benefit amount for your policy."

TABLE 3

| Client's Preferences | | | | | |
|---|---|---|---|---|---|
| 1. I would be comfortable relying on family or friends who live nearby to coordinate and/or provide care in the event I needed help. | Strongly Agree | Agree | Unsure | Disagree | Strongly Disagree |
| 2. I'm comfortable allocating a portion of my retirement income and assets to help pay for any long term care expenses I may incur. | Strongly Agree | Agree | Unsure | Disagree | Strongly Disagree |
| 3. I have several years before I retire, and today I'd prefer to own less coverage than I may ultimately need as long as I have the right to increase my coverage in the future regardless of how my health may change. | Strongly Agree | Agree | Unsure | Disagree | Strongly Disagree |

Client answers may be recorded on paper (using Table 4) or entered on a computer via known methods of data entry (selecting buttons, boxes, typing, etc.).

Instructions (for paper): Circle, in Table 4, your client's answers to the questions in Table 3. Add the scores to determine your client's Benefit Adjustment Score. Record this score in box 3 of Table 2.

(Computer implementation) Software records answers and calculates and stores total score.

TABLE 4

| Question | Strongly Agree | Agree | Unsure | Disagree | Strongly Disagree | Score |
|---|---|---|---|---|---|---|
| 1. | 2 | 3 | 4 | 5 | 6 | |
| 2. | 1 | 2 | 3 | 4 | 5 | |
| 3. | 1 | 2 | 3 | 4 | 5 | |

Benefit Adjustment Score → Record in box 3 of Table 2.

Find the Total Benefit Amount (Paper)

Figure 3:
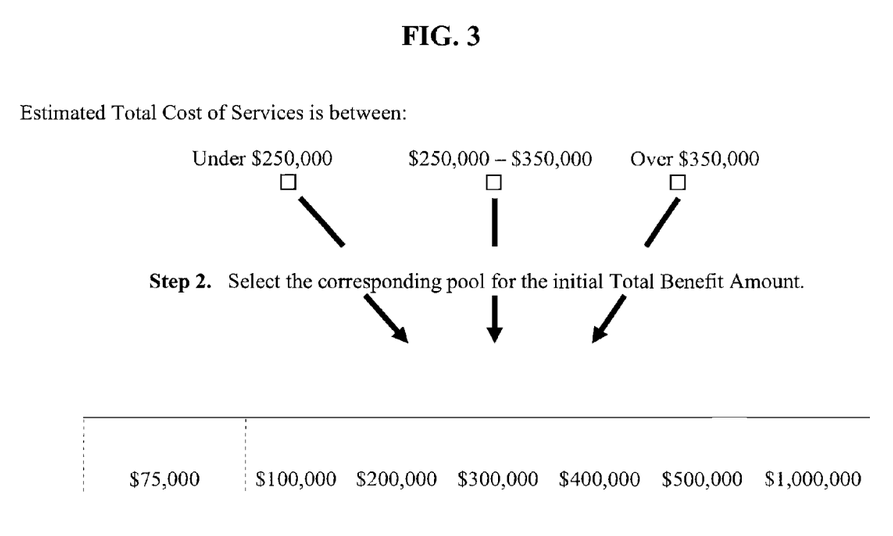
FIG. 3 depicts steps of an exemplary total benefit amount determination.

Step 1. Refer to box 2 in the Policy Recommendation Table (Table 2) and check the appropriate box in FIG. 3.

Step 2. Select the corresponding pool for the initial Total Benefit Amount.

Step 3. Use the Benefit Amount Adjustment table (Table 5) to shift the initial Total Benefit Amount higher or lower. Check the new box in FIG. 3 (that is, the box for the shifted Total Benefit Amount) and record the client's recommended Total Benefit Amount in box 4 in the Policy Recommendation Table (Table 2).

TABLE 5

| Benefit Adjustment Score | Required TBA Adjustment |
|---|---|
| 4-5 points | Reduce By 2 Benefit Levels |
| 6-7 points | Reduce By 1 Benefit Level |

TABLE 5-continued

| Benefit Adjustment Score | Required TBA Adjustment |
|---|---|
| 8-10 points | No Adjustment Required |
| 11-13 points | Increase By 1 Benefit Level |
| 14-16 points | Increase By 2 Benefit Levels |

(Computer implementation) The above steps, modified for computer implementation, are performed by software. For example, once the answers to questions 1-3 in Table 3 are received by the computer/software, the Benefit Adjustment Score and shift in benefit level may be calculated as shown in Table 5 and stored, and the Total Benefit Amount of box 4 of Table 2 may be calculated (and optionally displayed).

Find the Monthly Benefit Amount (Paper)

Figure 4:
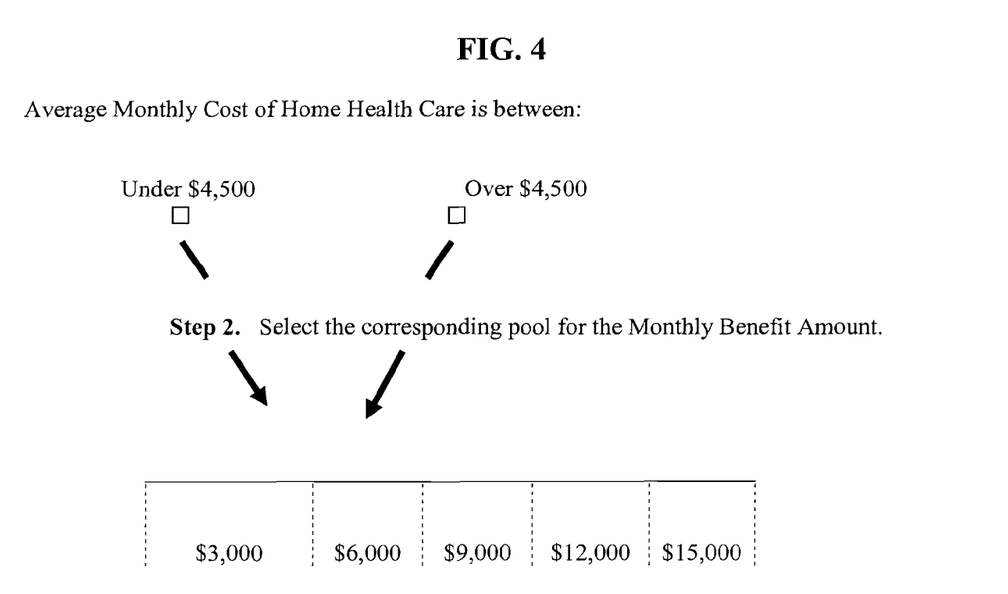
FIG. 4 depicts steps of an exemplary monthly benefit amount determination.

Step 1. Refer to box 1 in the Policy Recommendation Table and check the appropriate box in FIG. 4.

Step 2. Select the corresponding pool for the Monthly Benefit Amount.

Step 3. Use the Benefit Amount Adjustment table (Table 6) to shift the initial Monthly Benefit Amount higher or lower. Check the box and record your client's recommended Monthly Benefit Amount in box 5 of Table 2.

TABLE 6

| Benefit Adjustment Score | Required MBA Adjustment |
|---|---|
| 4-6 points | Reduce By 1 Benefit Level |
| 7-14 points | No Adjustment Required |
| 15 points | Increase By 1 Benefit Level |
| 16 points | Increase By 2 or 3 Benefit Levels - Your representative will help you understand which is best for your situation. |

(Computer implementation) The above steps, modified for computer implementation, are performed by software. For example, the software can use the stored value for box 1 and the stored Benefit Adjustment Score to shift the Monthly Benefit Amount as shown in Table 6. That data may then optionally be displayed.

II. Which Plan Is Most Appropriate?

The client's product recommendation is based on a combination of the Benefit Adjustment Score (see Table 7) and the client's age. In a computer implementation, the mapping to the appropriate policy recommendation may be made once the above data are stored and the client's age is entered. The data in boxes 6 and/or 7 of Table 2 may be determined as described below, displayed on a computer screen, and conveyed to the client.

TABLE 7

| Benefit Adjustment Score | Client's Age | Policy Recommendation |
|---|---|---|
| 4-10 Points | Age 18-61 | Write Simple Advantage in box 6 of the Policy Recommendation Table. See Tables 2 and 10 for your policy recommendation. |
| | Age 62-85 | Write Custom Advantage in box 6 of the Policy Recommendation Table and proceed to the Custom Advantage Inflation Question. |
| 11-16 Points | Age 18-85 | Write Custom Advantage in box 6 of the Policy Recommendation Table and proceed to the Custom Advantage Inflation Question. |

Partnership State Instruction:

If your client lives in a state that is part of the Federal Partnership program, he or she may want to consider selecting a Custom Advantage policy with an appropriate inflation option that will allow the policy to qualify under this program. This program adds an additional layer of protection by potentially disregarding an amount of your client's assets for the purpose of determining eligibility for Medicaid if policy benefits are ever exhausted. Each state has established its own unique Partnership Requirements for what constitutes a Partnership-Qualified Long-Term Care Insurance Policy.

Custom Advantage Inflation Question (complete only if Custom Advantage is recommended in Table 7).

Inflation Protection Discussion: "Over time, inflation can have an impact on the purchasing power of your money. For example, a $3,000 monthly benefit a few years from now will likely pay for fewer services than it would today. Your Custom Advantage policy will be customized based on your feelings toward inflation."

TABLE 8

| Client's Preference | | | | | |
|---|---|---|---|---|---|
| 1. Given my personal circumstances and preferences, it's important that my long term care benefit amount increases over time to keep up with inflation. | Strongly Agree | Agree | Unsure | Disagree | Strongly Disagree |

Instructions:

Based on the client's age and answer to the question in Table 8, use Table 9 to identify the most appropriate inflation option and record in box 7 of Table 2.

In a computer implementation, the mapping to the appropriate inflation option may be made once the above data are stored and the answer to the question in Table 8 is entered. That mapping is based on data corresponding to the information in Table 9.

TABLE 9

| Age | Strongly Agree | Agree | Unsure | Disagree | Strongly Disagree |
|---|---|---|---|---|---|
| Under 55 | 5% | 5% | 3% | FPO | FPO |
| 55-65 | 5% | 3% | 3% | FPO | FPO |
| 66-75 | 3% | 3% | FPO | FPO | |
| Over 75 | FPO | FPO | FPO | | |

"FPO" refers to a "Future Protection Option" policy, wherein an increase in benefits entails an increase in premiums, That is, the policy does not provide inflation protection.

TABLE 10

| Long Term Care Policy Recommendation | |
|---|---|
| Simple Advantage | Custom Advantage |
| The amount of coverage that's right for you is consistent with the cost of home health care in your area - or where you plan to retire. A Simple Advantage policy gives you the flexibility to own an amount of coverage today, and add to it later - as often as every three years, regardless of how your health may change. | You may be nearing retirement age, or your situation may call for a coverage amount that is higher than the average cost of care in your area, or where you plan to retire. You have the option of adding a benefit increase option to make sure your coverage stays current with the rising cost of care. |

TABLE 10-continued

Long Term Care Policy Recommendation

| Simple Advantage | Custom Advantage |
| --- | --- |
| This policy gives you the option to increase your coverage amount to as much as double your original total benefit amount, without having to provide proof of good health. This policy will protect your retirement assets from the expenses associated with needing long term care services to the extent of your Total Benefit Amount. | This policy will protect your retirement assets from the expenses associated with needing long term care services to the extent of your Total Benefit Amount. There are three optional benefits your representative will further discuss with you: Shared Care - Offers couples the ability to share their total benefit amounts with each other. Nonforfeiture - Guarantees you a reduced level of coverage if you stop paying premiums after three years. Cash Payment - Allows you to receive monthly cash payments rather than reimbursement for the care your receive. |

Figure 1:
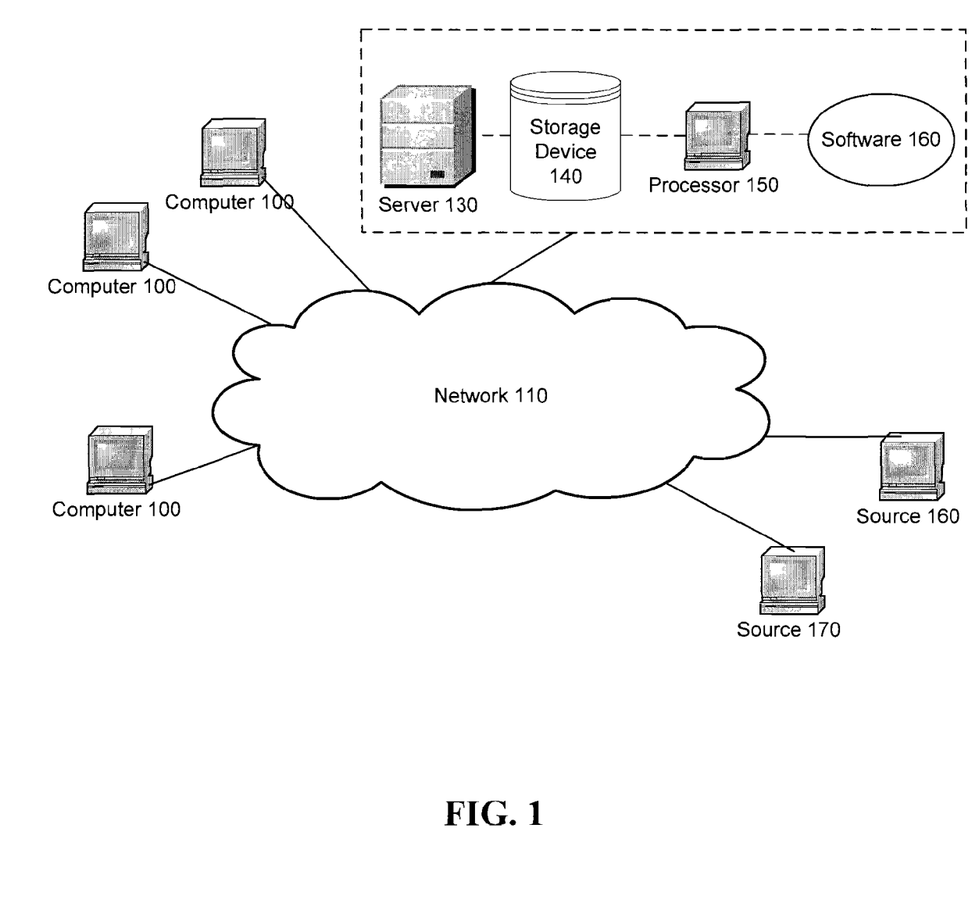
FIG. 1 depicts a computer based system for processing data according to an embodiment of the invention.

Embodiments of the present invention comprise computer components and computer-implemented steps that will be apparent to those skilled in the art. For example, calculations and communications can be performed electronically. An exemplary system is depicted in FIG. 1. As shown, computers 100 communicate via network 110 with a central server 130. A plurality of sources of data 160, 170 relating to, for example, consumer age and location, also may communicate via network 110 with a central server 130, processor 150, and/or other component to calculate and transmit, for example, policy recommendation data. The server 130 may be coupled to one or more storage devices 140, one or more processors 150, and software 160.

Other components/processors and combinations of components/processors may also be used to support processing data or other calculations described herein as will be evident to those skilled in the art. Server 130 may facilitate communication of data from a storage device 140 to and from processor 150, and communications to computers 100. Processor 150 may optionally include local or networked storage (not shown) which may be used to store temporary information. Software 160 can be installed locally at a computer 100, processor 150 and/or centrally supported for facilitating calculations and applications.

For simplicity of exposition, not every step or element of the present invention is described herein as part of a computer system and/or software, or as performed by a processor, but those skilled in the art will recognize that each step or element may have (and typically will have) a corresponding computer system or software component or processor. Such computer system and/or software components/processors are therefore enabled by describing their corresponding steps or elements (that is, their functionality), and are within the scope of the present invention.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified in the description and/or claims could be the same processor. All such combinations are within the scope of the invention.

Alternatively, the processing and decision steps described herein can be performed by functionally equivalent circuits such as a digital signal processor circuit or an application specific integrated circuit. The details described herein do not specify the syntax of any particular programming language, but rather provide sufficient functional information to enable one of ordinary skill in the art to perform the functions/processes in accordance with the present invention. It should be noted that many routine program elements, such as initialization of loops and variables and the use of temporary variables, are not shown, but will be understood by those skilled in the art to be part of software embodiments where applicable.

It will be appreciated by those of ordinary skill in the art that unless otherwise indicated herein, the particular sequences of steps and configurations of system and software components described are illustrative only and can be varied without departing from the scope of the invention. The present invention has been described by way of example only, and the invention is not limited by the specific embodiments described herein. As will be recognized by those skilled in the art, improvements and modifications may be made to the illustrative embodiments described herein without departing from the scope or spirit of the invention.

What is claimed is:

1. A computer implemented method comprising:
   determining an average monthly cost of long term care for a consumer;
   determining an estimated total cost of long term care for the consumer;
   receiving and storing in a computer readable medium data describing the consumer's preferences regarding long term care resources comprising said consumer's preference with respect to an allocation of retirement assets to be used to support long term care expenses incurred by the consumer;
   calculating, with a processor, an initial benefit amount for the consumer;
   calculating, with a processor, a Benefit Adjustment Score;
   adjusting, with a processor, the initial benefit amount based on said Benefit Adjustment Score to determine a total benefit amount; and
   recommending a long term care policy providing said total benefit amount to said consumer,
   wherein said processors may be the same processor or different processors, and
   wherein the Benefit Adjustment Score is determined from a plurality of questions about the consumer's attitude regarding retirement assets and long term care options, and the steps of:

assigning an answer value based on a Likert scale to one or more different answers to the plurality of questions;

recording responses to the plurality of questions;

calculating the Benefit Adjustment Score based on the answer values from the answers given in the response; and comparing the Benefit Adjustment Score to a pre-generated list of benefit levels.

2. A method as in claim 1, wherein determining an average monthly cost of long term care for a consumer is based on the consumer's geographic location.

3. A method as in claim 1, wherein determining an estimated total cost of long term care for a consumer is based on the consumer's geographic location.

4. A method as in claim 1, wherein said consumer's preferences regarding long term care resources comprise said consumer's preference for relying on friends and family for long term care.

5. A method as in claim 1, wherein said consumer's preferences regarding long term care resources comprise said consumer's preference for having an amount of coverage with the option to increase coverage in the future instead of having a full amount of coverage.

6. A method as in claim 1, further comprising receiving and storing data regarding said consumer's inflation protection preferences.

7. A method as in claim 6, wherein said long term care policy provides inflation protection.

8. A non-transitory program storage device readable by a machine, tangibly embodying a program of instructions executable by the machine to perform steps comprising:

determining an average monthly cost of long term care for a consumer;

determining an estimated total cost of long term care for the consumer;

receiving data describing the consumer's preferences regarding long term care resources comprising said consumer's preference with respect to an allocation of retirement assets;

calculating an initial benefit amount for the consumer;

calculating a Benefit Adjustment Score, based on said consumer's preferences regarding long term care resources, wherein the Benefit Adjustment Score is determined from a plurality of questions about the consumer's attitude regarding retirement assets and long term care, and the steps of:

assigning an answer value based on a Likert scale to one or more different answers to the plurality of questions;

recording responses to the plurality of questions;

calculating the Benefit Adjustment Score based on the answer values from the answers given in the response; and comparing the Benefit Adjustment Score to a pre-generated list of benefit levels;

adjusting the initial benefit amount based on said Benefit Adjustment Score to determine a total benefit amount; and recommending a policy providing said total benefit amount to said consumer.

9. A device as in claim 8, wherein determining with a processor an average monthly cost of long term care for a consumer is based on the consumer's geographic location.

10. A device as in claim 8, wherein determining with a processor an estimated total cost of long term care for a consumer is based on the consumer's geographic location.

11. A device as in claim 8, wherein said consumer's preferences regarding long term care resources comprise said consumer's preference for relying on friends and family for long term care.

12. A device as in claim 8, wherein said consumer's preferences regarding long term care resources comprise said consumer's preference for having an amount of coverage with the option to increase coverage in the future instead of having a full amount of coverage.

13. A device as in claim 8, further comprising receiving and storing data regarding said consumer's inflation protection preferences.

14. A device as in claim 13, wherein said long term care policy provides inflation protection.

15. A computer system comprising:

a processor that determines an average monthly cost of long term care for a consumer;

a processor that determines an estimated total cost of long term care for the consumer;

a processor that receives and stores in a computer readable medium data describing the consumer's preferences regarding long term care resources comprising said consumer's preference with respect to an allocation of retirement assets;

a processor that calculates an initial benefit amount for the consumer;

a processor that calculates a Benefit Adjustment Score, based on said consumer's preferences regarding long term care resources;

a processor that adjusts the initial benefit amount based on said Benefit Adjustment Score to determine a total benefit amount; and a processor that recommends a long term care policy providing said total benefit amount to said consumer, wherein the Benefit Adjustment Score is determined from a plurality of questions about the consumer's attitude regarding retirement assets and long term care options, and the steps of:

a processor that assigns an answer value based on a Likert scale to one or more different answers to the plurality of questions;

a processor that receives and stores in a computer readable medium responses to the plurality of questions;

a processor that calculates the Benefit Adjustment Score based on the answer values from the answers given in the response; and a processor that compares the Benefit Adjustment Score to a pre-generated list of benefit levels, wherein said processors may be the same processor or different processors.

16. A system as in claim 15, wherein determining an average monthly cost of long term care for a consumer is based on the consumer's geographic location.

17. A system as in claim 15, wherein determining an estimated total cost of long term care for a consumer is based on the consumer's geographic location.

18. A system as in claim 15, wherein said consumer's preferences regarding long term care resources comprise said consumer's preference for relying on friends and family for long term care.

19. A system as in claim 15, wherein said consumer's preferences regarding long term care resources comprise said consumer's preference for having an amount of coverage with the option to increase coverage in the future instead of having a full amount of coverage.

20. A system as in claim 15, further comprising a processor that receives and stores data regarding said consumer's inflation protection preferences.

21. A system as in claim 20, wherein said long term care policy provides inflation protection.

* * * * *